US011803694B1

(12) United States Patent
Baumgartner et al.

(10) Patent No.: US 11,803,694 B1
(45) Date of Patent: *Oct. 31, 2023

(54) PROCESSING AND DELIVERY OF PRIVATE ELECTRONIC DOCUMENTS

(71) Applicant: West Corporation, Omaha, NE (US)

(72) Inventors: Gretel Baumgartner, Corvallis, OR (US); Nathaniel Brogan, Los Angeles, CA (US); Nickolas Heckman, Santa Cruz, CA (US); Joshua M. Heizman, Overland Park, KS (US); Benjamin P. Hencke, Santa Cruz, CA (US); Sean Michael Kelly, Santa Cruz, CA (US); Ronald Park, Belmont, CA (US); Howard A. Wood, Aptos, CA (US)

(73) Assignee: INTRADO CORPORATION, Omaha, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/273,585

(22) Filed: Feb. 12, 2019

Related U.S. Application Data

(63) Continuation of application No. 14/618,768, filed on Feb. 10, 2015, now Pat. No. 10,204,095.

(51) Int. Cl.
| | |
|---|---|
| *G06F 40/14* | (2020.01) |
| *G06F 40/10* | (2020.01) |
| *G06F 40/16* | (2020.01) |
| *G06F 40/103* | (2020.01) |
| *G06F 40/131* | (2020.01) |
| *G06F 40/134* | (2020.01) |
| *G06F 40/258* | (2020.01) |

(52) U.S. Cl.
CPC .............. *G06F 40/14* (2020.01); *G06F 40/10* (2020.01); *G06F 40/103* (2020.01); *G06F 40/131* (2020.01); *G06F 40/134* (2020.01); *G06F 40/16* (2020.01); *G06F 40/258* (2020.01)

(58) Field of Classification Search
CPC ........ G06F 17/248; G06F 40/14; G06F 40/10; G06F 40/103; G06F 40/131; G06F 40/134; G06F 40/16; G06F 40/258
See application file for complete search history.

(56) References Cited

U.S. PATENT DOCUMENTS

| | | | | |
|---|---|---|---|---|
| 7,219,301 B2 * | 5/2007 | Barrie | .................... | G06Q 50/00 434/322 |
| 7,484,178 B2 * | 1/2009 | Sholl | ..................... | G06F 40/226 715/205 |
| 7,617,136 B1 * | 11/2009 | Lessing | ................ | G06Q 10/087 705/22 |
| 8,151,183 B2 * | 4/2012 | Chen | .................... | G06F 16/9577 715/234 |

(Continued)

*Primary Examiner* — Benjamin Smith

(57) ABSTRACT

Electronic documents may be large and have numerous pages, sections and areas of information that are useful to some individuals and not others. It is common for large documents to include some information that is intended for only certain recipients and other information that is intended for other recipients. One example may provide receiving a document including a number of pages, identifying a number of extraction attributes corresponding to various users identified in the document, querying the document for the extraction attributes, and creating a number of new documents corresponding to the extraction attributes.

20 Claims, 13 Drawing Sheets

(56) References Cited

U.S. PATENT DOCUMENTS

| | | | | |
|---|---|---|---|---|
| 8,296,661 B2* | 10/2012 | Barrie | | G06Q 50/00 715/751 |
| 8,782,042 B1* | 7/2014 | Cooke | | G06F 40/30 707/729 |
| 8,995,774 B1* | 3/2015 | van Deventer | | G06K 9/00463 382/217 |
| 9,223,756 B2* | 12/2015 | Agrawal | | G06F 40/10 |
| 9,286,283 B1* | 3/2016 | Wilczek | | G06K 9/00449 |
| 9,298,780 B1* | 3/2016 | Madhani | | G06F 16/258 |
| 9,418,051 B2* | 8/2016 | Dong | | G06F 40/10 |
| 9,418,315 B1* | 8/2016 | Keogh | | G06K 9/2063 |
| 9,754,187 B2* | 9/2017 | Panferov | | G06K 9/00483 |
| 9,785,999 B2* | 10/2017 | Wilczek | | G06Q 30/04 |
| 10,635,744 B2* | 4/2020 | Beth | | G06F 16/282 |
| 2002/0029232 A1* | 3/2002 | Bobrow | | G06K 9/00483 514/534 |
| 2002/0156803 A1* | 10/2002 | Maslov | | G06F 17/2229 715/234 |
| 2003/0118976 A1* | 6/2003 | Makishima | | G09B 7/00 434/349 |
| 2003/0164849 A1* | 9/2003 | Barrie | | G06Q 50/00 715/733 |
| 2003/0215137 A1* | 11/2003 | Wnek | | G06K 9/00469 382/181 |
| 2005/0216829 A1* | 9/2005 | Kalinichenko | | H04M 15/70 715/205 |
| 2006/0188862 A1* | 8/2006 | Johnson | | G09B 7/07 434/350 |
| 2006/0193008 A1* | 8/2006 | Osaka | | G06F 17/211 358/1.18 |
| 2007/0133067 A1* | 6/2007 | Garg | | G06F 17/211 358/462 |
| 2007/0146823 A1* | 6/2007 | Borchers | | H04N 1/00244 358/496 |
| 2007/0150809 A1* | 6/2007 | Yoshida | | G06F 40/154 715/235 |
| 2007/0288851 A1* | 12/2007 | Barrie | | G06Q 50/00 715/751 |
| 2008/0147790 A1* | 6/2008 | Malaney | | G06Q 10/00 709/203 |
| 2008/0307454 A1* | 12/2008 | Ahanger | | G06Q 30/02 725/36 |
| 2009/0265339 A1* | 10/2009 | Chen | | G06F 40/143 |
| 2010/0070879 A1* | 3/2010 | Barrie | | G06Q 50/00 715/751 |
| 2010/0169311 A1* | 7/2010 | Tengli | | G06F 16/951 707/736 |
| 2011/0194137 A1* | 8/2011 | Klassen | | G06F 3/1211 358/1.15 |
| 2013/0167018 A1* | 6/2013 | Dong | | G06F 40/103 715/244 |
| 2013/0191445 A1* | 7/2013 | Gayman | | H04L 29/06047 709/203 |
| 2014/0033010 A1* | 1/2014 | Richardt | | G06F 17/217 715/222 |
| 2014/0281939 A1* | 9/2014 | Agrawal | | G06F 40/10 715/256 |
| 2015/0012339 A1* | 1/2015 | Onischuk | | G07C 13/00 705/12 |
| 2015/0078671 A1* | 3/2015 | van Deventer | | G06K 9/00463 382/217 |
| 2015/0242075 A1* | 8/2015 | Watanabe | | G06F 16/93 715/776 |
| 2015/0278593 A1* | 10/2015 | Panferov | | G06K 9/00483 382/182 |
| 2015/0373208 A1* | 12/2015 | Watts | | H04N 1/001 358/1.15 |
| 2016/0092423 A1* | 3/2016 | Wilczek | | G06K 9/00449 715/223 |
| 2016/0098779 A1* | 4/2016 | Wilczek | | G06Q 30/0633 705/26.8 |
| 2016/0117941 A1* | 4/2016 | Mitchell | | G06Q 10/101 434/362 |
| 2016/0196254 A1* | 7/2016 | Wilczek | | G06F 40/186 715/223 |

* cited by examiner

220

```
ACCESS BURSTING
MENU
222
    │
    ▼
CREATE NEW
BURSTING JOB
224
    │
    ▼
UPLOAD FILE
226
    │
    ▼
SELECT A
BURSTING
TEMPLATE
228
    │
    ▼
SUBMIT
NUMBER OF
PAGES PER
REPORT AND
PAGES TO
SKIP
230
    │
    ▼
CREATE EMAIL
SUBJECT AND
BODY
232
    │
    ▼
INVOKE
PASSWORD
PROTECTION
236
   │ YES        │ NO
   ▼            │
PASSWORD       │
SETUP          │
237            │
   │           │
   ▼           ▼
PROCESSING
INITIATED TO
BEGIN BURSTING
OPERATION
238
    │
    ▼
SUMMARY PAGE
GENERATED
WITH RECORD
AND LINK TO THE
NEW FILE
240
    │
    ▼
EMAIL SENT
WITH SUMMARY
242
```

PROCESSING AND DELIVERY OF PRIVATE ELECTRONIC DOCUMENTS

TECHNICAL FIELD OF THE APPLICATION

This application relates to a procedure of creating, labeling and sharing private electronic document, and more specifically, to creating a private electronic document from an information source and providing access to users via links associated with electronic mail messages.

BACKGROUND OF THE APPLICATION

Conventionally, when large documents are created, a user must manually extract information and create new individual documents based on the extracted information. For example, a university may create a large ADOBE ACROBAT .PDF file to represent user information for each student (e.g. thousands of students). Similarly, large corporations, businesses, hospitals, etc. may log user information of clients, employees, etc., and place the information in one or more large documents with many pages. The file may have a large file size among other attributes which are difficult to manage.

Continuing with the school examples, certain examples of reports could include: report cards, progress reports, truancy/attendance letters, bus assignment information, locker assignments, course schedules, personalized permission/registration forms. For example, conventional applications would generate report cards, resulting in a 600 page PDF-type file, with report cards for 600 students. Each page would generally have the student's ID number among other forms of student information. When uploading this PDF file, the system would recognize the student ID on each page and extract the page(s) appropriate for each student. A user would then be able to view the resulting report for any given student as a QA check, prior to initiating the broadcast, and see any unique identifiers that couldn't be matched. This approach would of course only work on native report PDFs with recognizable characters as opposed to purely image/scanned documents character recognition. This feature would also be applicable in an AUTOMESSENGER product. It's common for businesses to use this type of functionality to transmit invoices to customers for example, using a customer ID on each page.

SUMMARY OF THE APPLICATION

One example embodiment of the present application may provide a method that includes receiving a document comprising a plurality of pages, identifying at least one extraction attribute, querying the document for the at least one extraction attribute, applying at least one coordinate to information associated with the at least one extraction attribute, extracting information based on the extraction attribute and a predefined area associated with the at least one coordinate, and creating a new document comprising the information extracted.

Another example embodiment may include an apparatus that includes a receiver configured to receive a document including a number of pages and a processor configured to identify at least one extraction attribute, query the document for the at least one extraction attribute, apply at least one coordinate to information associated with the at least one extraction attribute, extract information based on the extraction attribute and a predefined area associated with the at least one coordinate, and create a new document comprising the information extracted.

Another example embodiment may include a method that includes receiving a document including a number of pages, identifying a plurality of extraction attributes corresponding to a number of users identified in the document, querying the document for the plurality of extraction attributes, and creating a number of new documents corresponding to the plurality of extraction attributes.

Another example embodiment may include an apparatus that provides a receiver configured to receive a document including a plurality of pages, and a processor configured to identify a plurality of extraction attributes corresponding to a plurality of users identified in the document, query the document for the plurality of extraction attributes, and create a plurality of new documents corresponding to the plurality of extraction attributes.

BRIEF DESCRIPTION OF THE DRAWINGS

FIG. 2B illustrates another example flow diagram of a document creation procedure and a document sharing procedure according to example embodiments.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
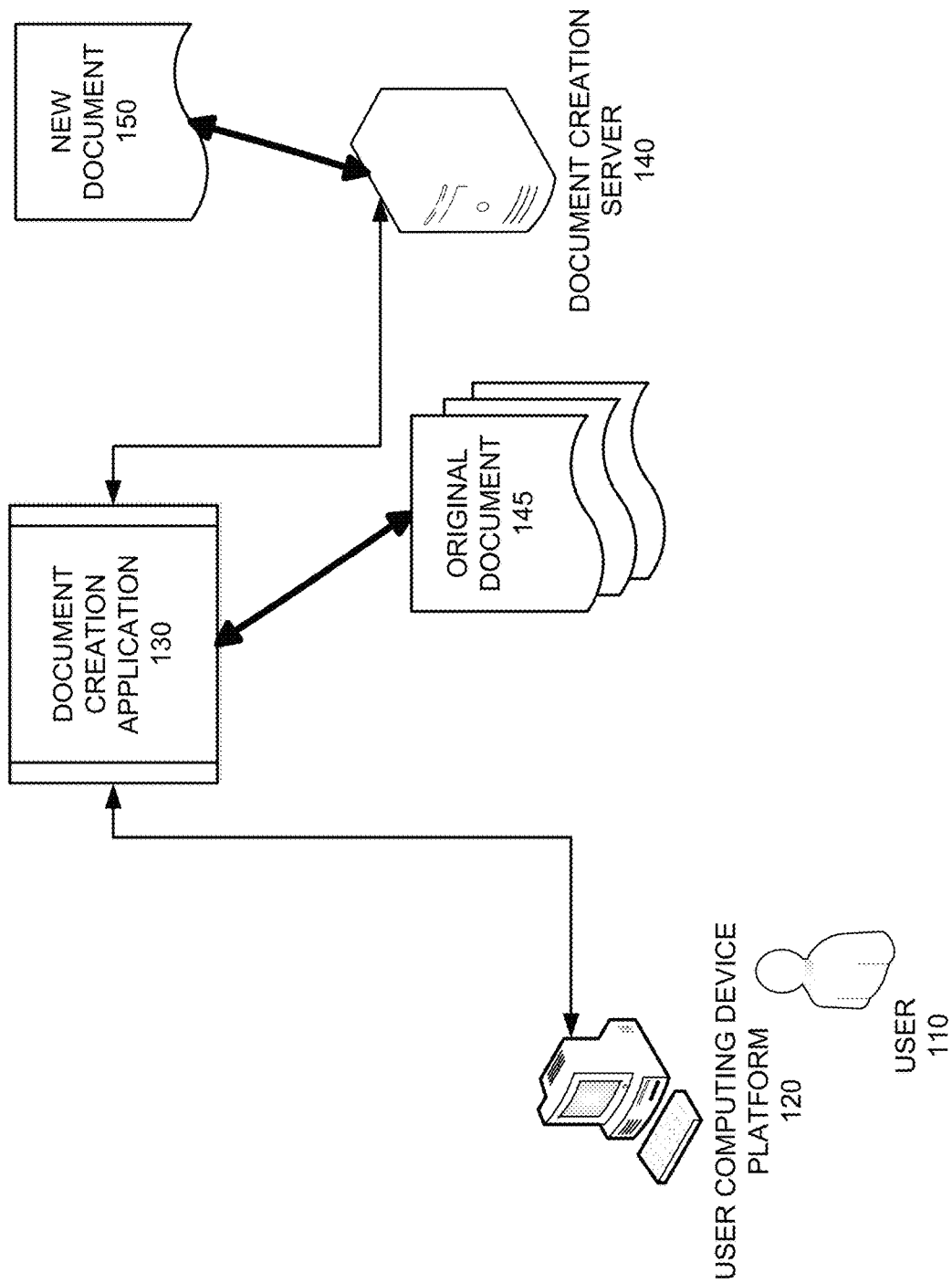
FIG. 1 illustrates an example network communication diagram according to example embodiments of the present application.

FIG. 1 illustrates an example network configuration according to example embodiments of the present application. Referring to FIG. 1, a user computing platform 120 may be accessed by a user 110 to initiate the document creation application 130 as a local and/or remote application (e.g., cloud application). The user may identify a base document or original document 145 that will be the source of information for at least one new document 150. A document creation server 140 may store the original document 145 and the newly created new documents specified by the document creation application 130. The original document 145 may be hundreds of pages in length and have various fields, images, database references, and other information for a large number of students, patients, employees, etc. For example, in the university setting, thousands of students may have their class listings, status, picture, major, address, awards, affiliations and extra-curricular activities, grades, etc. posted on one or more pages of the original document. However, accessing one particular user record among thousands may create time-consuming efforts for the staff or member of the information technology (IT) team.

Although a school or university example is being discussed throughout this disclosure, one of ordinary skill would readily recognize that various different institutions and organizations may also be used as the basis for the underlying embodiments. In one example, school districts of one or more schools in a particular location or district currently generate large reports which contain data specific to an individual student on a per-page or per-'n'-page(s) basis. These documents are commonly used as a printout, which may be handed off to students, parents and/or mailed via the U.S. postal service. The district incurs a large cost in creating and sending such reports, which presents an opportunity to mitigate the expenses through some sort of automatic dissection of the larger report into individual reports. The individual reports can then be emailed, or provided digitally, directly to the student or parent.

According to example embodiments the data should be accessible to an end user with as little a barrier as possible. Accordingly, example embodiments disclose using an automated email message and attachment as a simple and optimal approach for sharing the new documents created for each user. Some examples include linking a location containing the file download, which requires a single piece of additional information for access purposes, such as a phone number.

According to example embodiments, a user may email a sample of a PDF document they want to be the basis for a bursting template. For example, a template being a derived or new document that is created and which is paired with a link created and shared with a recipient via email. The bursting implies the document is sent automatically and other documents are created and are sent as well to other recipients via email. The document creation application 130 may process the sample and creates a bursting template by receiving an unprocessed report or original document 145 and identifying the unique identifier on the report. Also, the application 130 may also identify the position of the unique identifier in the document (e.g, left justified, center justified, right justified, top justified, middle justified, bottom justified, etc.) and the number of pages per report to be generated (e.g., 1, 2 . . . n, etc.). The application will then establish a mapping by identifying the location of the unique identifier (e.g., student identifier, employee number, etc.) and entering the coordinates of that identifier as a query in the document creation server 140.

A bursting template is a record describing a procedure and parameters used when matching a set of pages with a person or profile. The template may include information, such as an algorithm, "coordinates", as well as parameters, such as the x/y page coordinate(s) to be used, number of header/footer pages to skip, number of pages per record, regular expression matching patterns, etc. A bursting template is not required by the burst feature operation, but is used as a convenience measure in reusing a set of parameters across similar documents.

The operation of bursting includes applying one or more algorithms and parameters to a document in order to match and identify a person's records having a subset of pages, and for splitting a document into its constituent parts, either prior to delivery or on an as-needed basis.

In other examples, the PDF report bursting tool can be used to display a list of the available PDF bursting templates each with the necessary identifiers, locations, etc., of information to be retrieved from a master/original document and added to a new document to be sent in a link to a recipient. The applications permit a user to upload a PDF to be bursted with a large file size capacity. Other bursting setup and execution attributes may allow a user to define the number of pages to skip in the beginning and at the end. This may permit a user to select a job type, create a subject for the email, and enter the body of the email that precedes the PDF URL link. Also, the user may select whether the PDF URL needs password protection. If so, the user can define which field or key they want to use as the password. A summary page may be provided to show the user the list of student IDs and student name or grade that the system found in the PDF file from the location operation. As a result, a link next to each student record may be created which permits the user to download the bursted PDF document specific to that student. This operation may operate as a validation step that the PDF document has been bursted correctly. Next, an email is created and transmitted with the new PDF document link available through a URL, not as a direct attachment to the email.

Figure 2A:
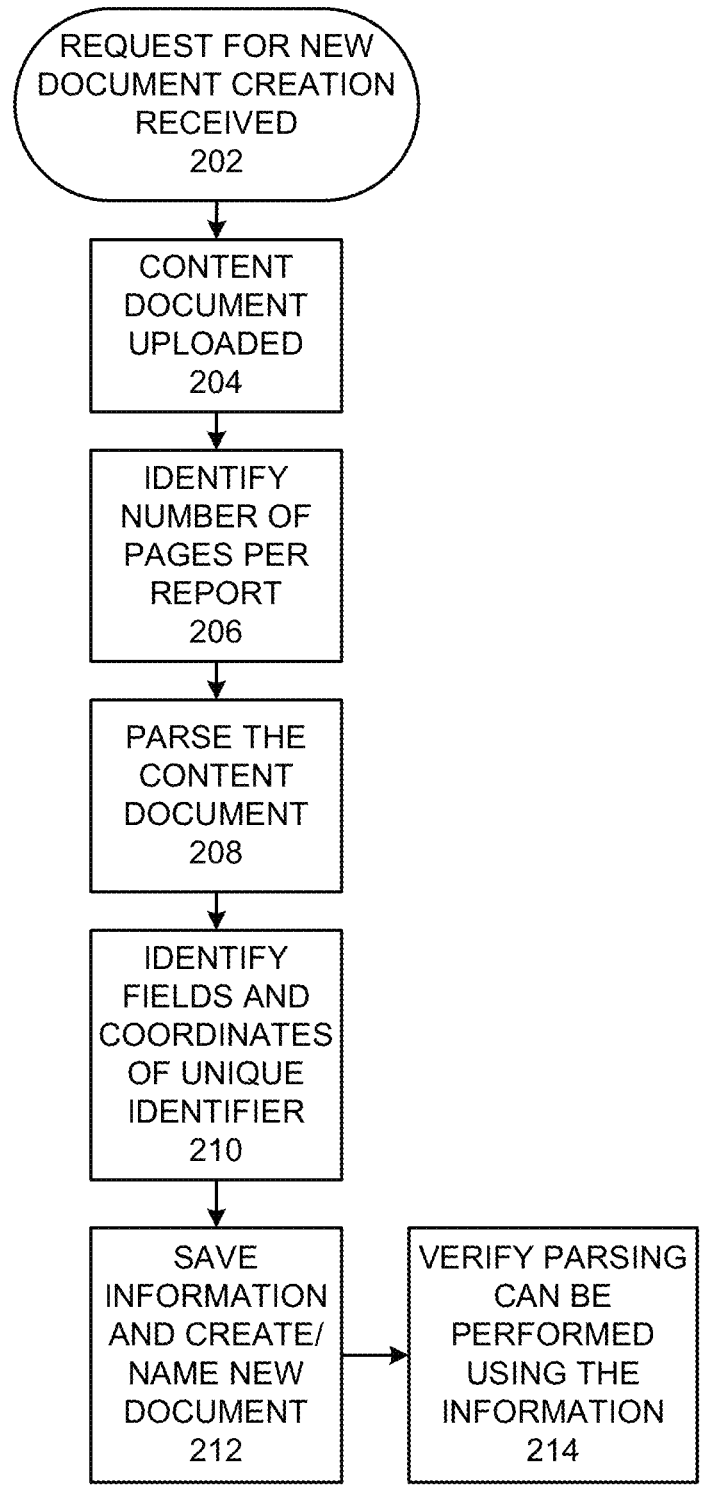
FIG. 2A illustrates an example flow diagram of a document creation procedure according to example embodiments.

FIG. 2A illustrates an example flow diagram of a document creation procedure according to example embodiments. Referring to FIG. 2A, the procedure 200 may begin with a request for a new document being received 202. The content or original document may then be uploaded 204 as the basis for the new document or new documents. A first user attribute may be identified as the basis for the new document creation, such as an identity number associated with a user, which may also provide a number of pages 206 that include that identity number. The content of the document may be parsed 208 and certain identity fields and coordinates linked to the unique identifier may also be identified 210 to provide the basis for the new document. The coordinates may be based on the position of the user information near the identifier in all four directions of the document page. Also, a justification may be identified for the user (e.g., left, right, center). The resulting information (e.g., identifier, coordinates, justification, etc.) can then be logged and saved 212 and a test may be performed to verify the parsing can be used to identify and create the new document prior to generating a notification and link to notify the user of the document availability.

FIG. 2B illustrates another example flow diagram of a document creation procedure and a document sharing procedure according to example embodiments. Referring to FIG. 2B, the procedure 220 may begin with a bursting menu request 222 to create a new bursting job 224. The file may be uploaded 224 and a bursting template can be selected 228 as the basis for creating the new document. A number of pages per report and the pages to skip may be identified 230, an email may be created including a subject and body text to be used as the notification 232. Password protection may be invoked 236 or not and if so, then the password may be entered 237 if not the procedure may be continued to begin the bursting operation 238 of creating the new document. The summary page may be generated with a record and link to a new file 240. The summary can be emailed with a summary 242.

Figure 2C:
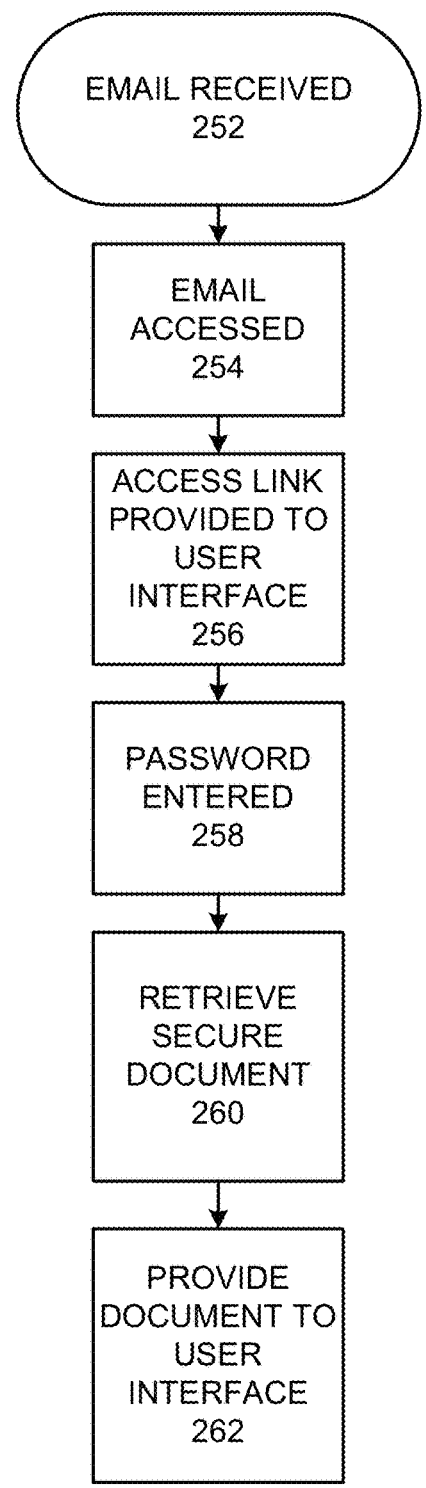
FIG. 2C illustrates an example flow diagram of a document access procedure according to example embodiments.

FIG. 2C illustrates an example flow diagram of a document access procedure according to example embodiments. Referring to FIG. 2C, the email may be received 252 at a user computing device and accessed 254 via the link in the computing device at the user interface 256. The password may be entered 258 and submitted to retrieve the secure new document customized for that user 260. The document may be provided to a user interface 262 for a user to review.

Figure 3A:
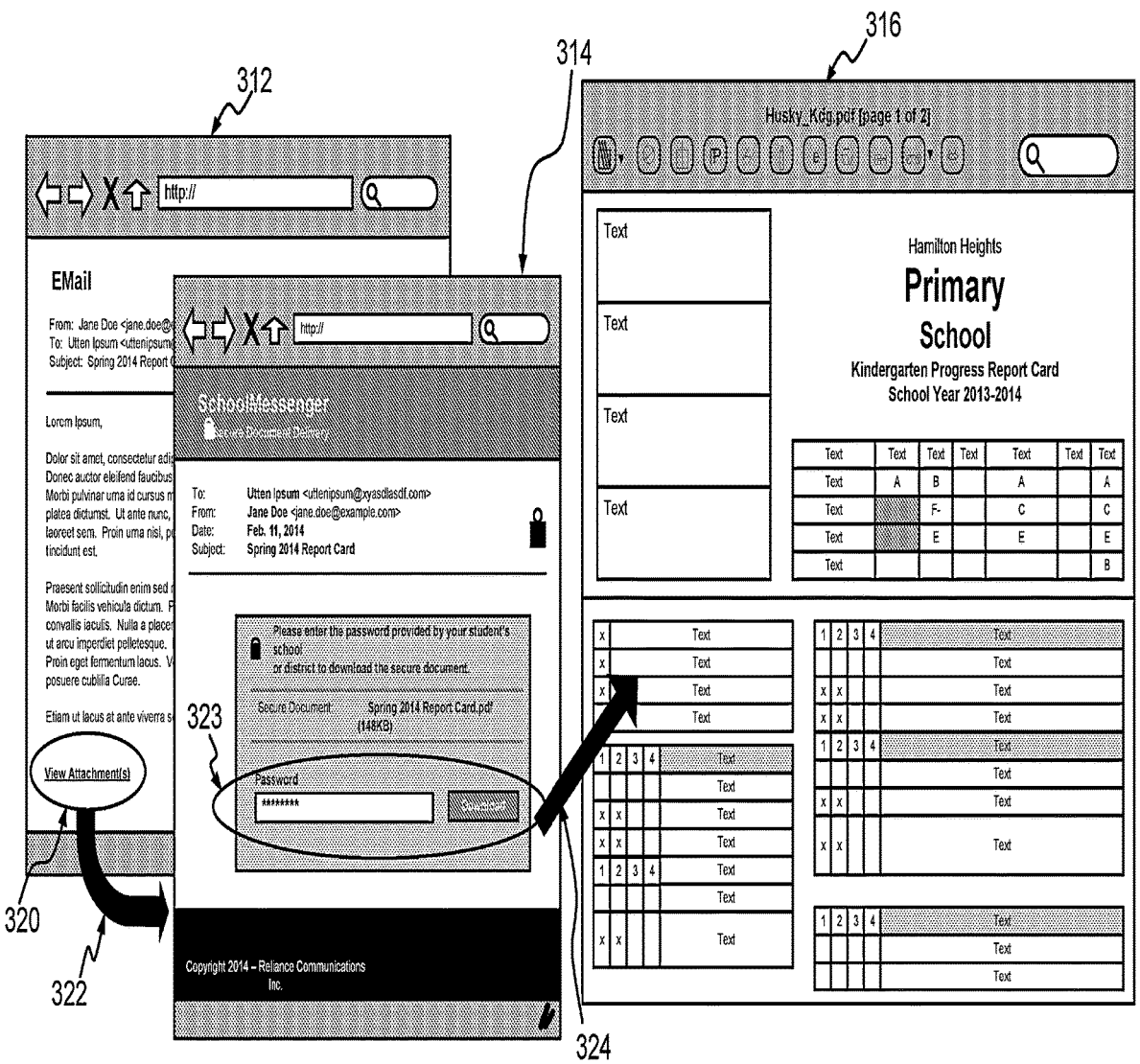
FIG. 3A illustrates an example user interface of a document sharing procedure according to example embodiments.

FIG. 3A illustrates an example user interface of a document sharing procedure according to example embodiments. Referring to FIG. 3A, the interface 300 includes an email contents 312 which are sent to the user interface with a link to the email 320, which when accessed 322 initiates the security interface 314. Once a username and/or password are submitted 323, the interface becomes 324 the new document 316 for the user to review.

Figure 3B:
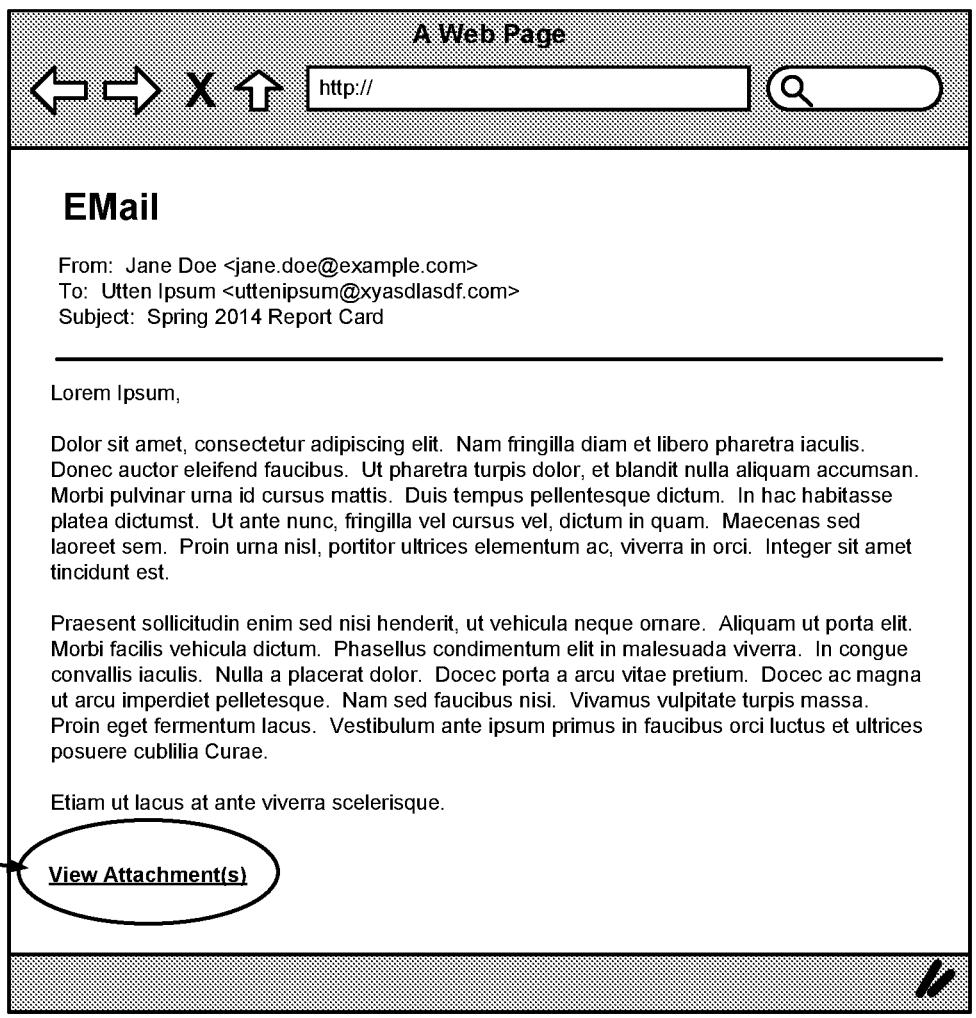
FIG. 3B illustrates an example user interface of a user email with the attached document link according to example embodiments.
Figure 3C:
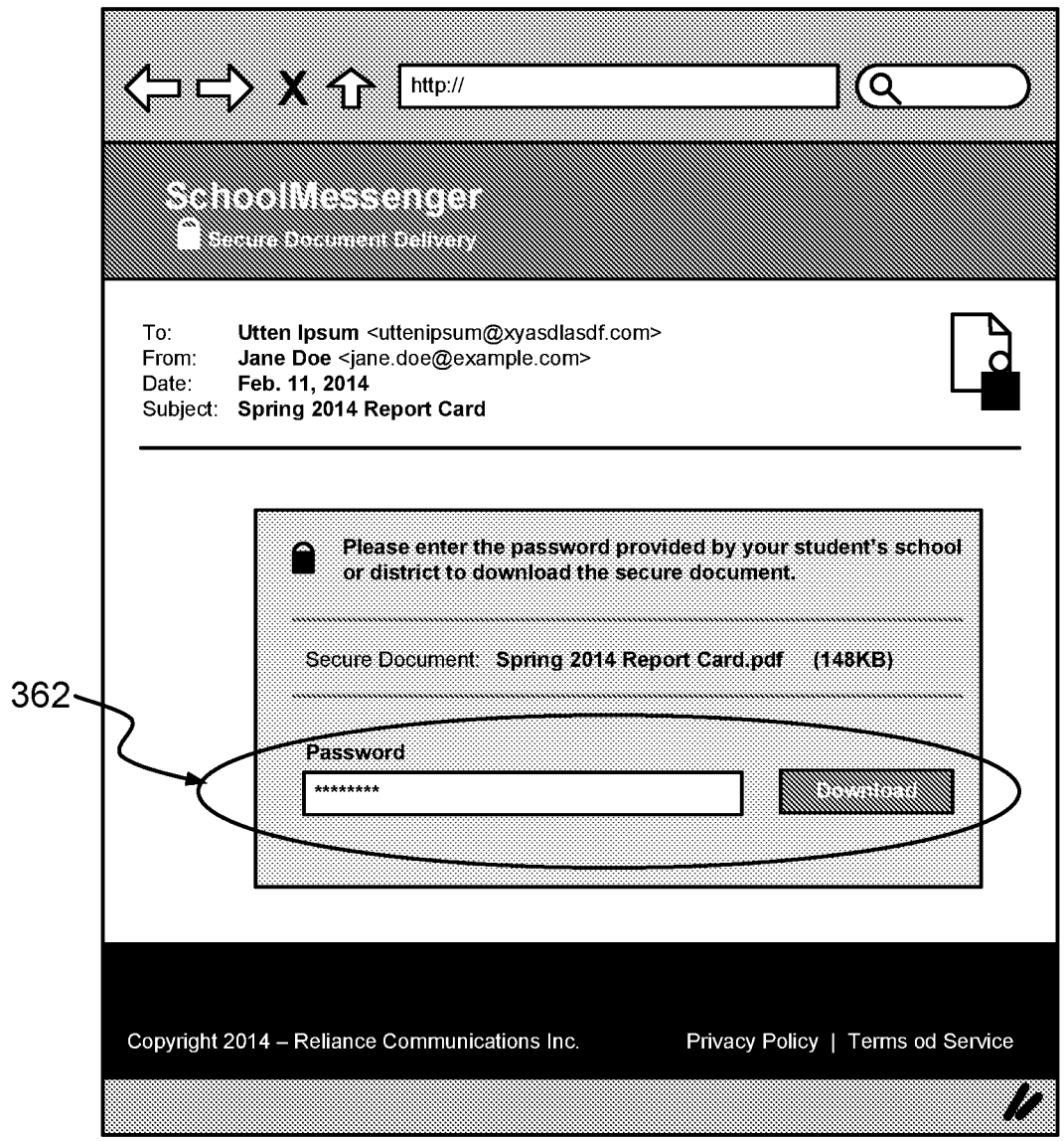
FIG. 3C illustrates an example user interface of a user email being accessed from password protection according to example embodiments.

FIG. 3B illustrates an example user interface of a user email 350 with the attached document link according to example embodiments. The email may have at least one recipient, a subject, text in the body of the email and at the bottom is a link 330 to the new document. FIG. 3C illustrates an example user interface of a user email being accessed from password protection according to example embodiments. The user interface 360 includes a password interface 362 where the user can enter and submit the password.

An 'F-field' or field-specific password provides one approach for permitting a document to be secured by requiring that the recipient enter in a secret piece of information specified by the customer. Securing a portion document of a larger document via a password or secret information could be implemented in various different ways, however the examples disclosed in this application are providing ways to limit access to the sub-document to a limited number of persons. The intended recipient of the sub-document is the primary way to limit access to the document, and authentication methods can be used to establish a chain of trust that permits or denies access to the secured document. The information may not be limited to passwords, other secret information may be used including semi-secret information at the customers discretion e.g. the student's school ID number, etc.

The original document may be used as a source and may be based on a large document with multiple pages. A new document or sub-document can be created as a series of multiple documents each linked to one another. The new document can be combined with other documents or fragments of documents to create content that was not otherwise wholly contained in the original document. The original document is stored and should not be exposed in whole to the recipients. The new documents may be any number of pages but are generally much smaller than the original document. Also, the new document may not be a document file and may instead by a number of page identifiers, excerpts of document pages and may require access to the original document but may not be a document itself. The "bursted" documents are the new documents created for each recipient that are 1 or more pages in length.

Selecting coordinates within the original document is performed before the bursting process. A tool is used by support technicians to scan and identify the coordinates, and then creates the burst template. The technician can add additional parameters, such as the number of header/footer pages to skip and optionally a regular expression tailored to the layout of the unique identifier IDs in the specific document. The coordinates and optional regular expression and other parameters are then stored in a burst template. When a document is "bursted" the coordinates algorithm uses parameters, such as number of header/footer pages and pages per record to identify a candidate page. The candidate page is then searched for including textual content around the specified coordinates to locate a potential ID in an ASCI or ASCII type format. The potential ID is then run through additional checks, such as a regular expression that may be used to further test for validity (e.g., number of characters, numbers, letters, database matching, etc.) and/or a subset of the text can be extracted at that location. For example, "ID: 123" could be located at the coordinates, and we could use the additional parameters to test for and remove the "ID" part leaving us with the ID number only.

An example burst template may provide:
x: 11.00000000
y: 745.79263300
skip start pages: 0
skip end pages: 0
pages per record: 1
ID pattern: "StudentID:([0-9]+)"

The number of header/footer pages to skip is currently specified for the original document via the burst template, and is applicable to that document. Individually generated portions of that document would include all applicable pages to the individual being targeted and would not contain any pages needing to be excluded. The number of pages per report is also specified via the burst template when it is created. This number is identified through a process where the original document is processed by a tool which applies the same algorithms used in the "burst" process to identify candidates for use as uniquely identifiable fields, and which pages that data can be found.

The numbers, skipped header/footer pages and pages per individual report, could be automatically detected through the process of "bursting" the document where uniquely identifiable fields, and the number of pages for which it is applicable are identified and recorded. The number of pages per individual report could be dynamic permitting some to contain more or less pages than others in the same original master document. The "bounding box" describes a piece of text inside a PDF document and its location on a specific page. The coordinates of the "bounding box" are used to identify points, such as X and Y coordinates, when defining the burst template such that the selected points approximates the location of this text or "bounding box". The actual coordinates for the text can vary from page to page in the original document, so the box or coordinates may not be relied upon when bursting the document into smaller portions.

Figure 4:
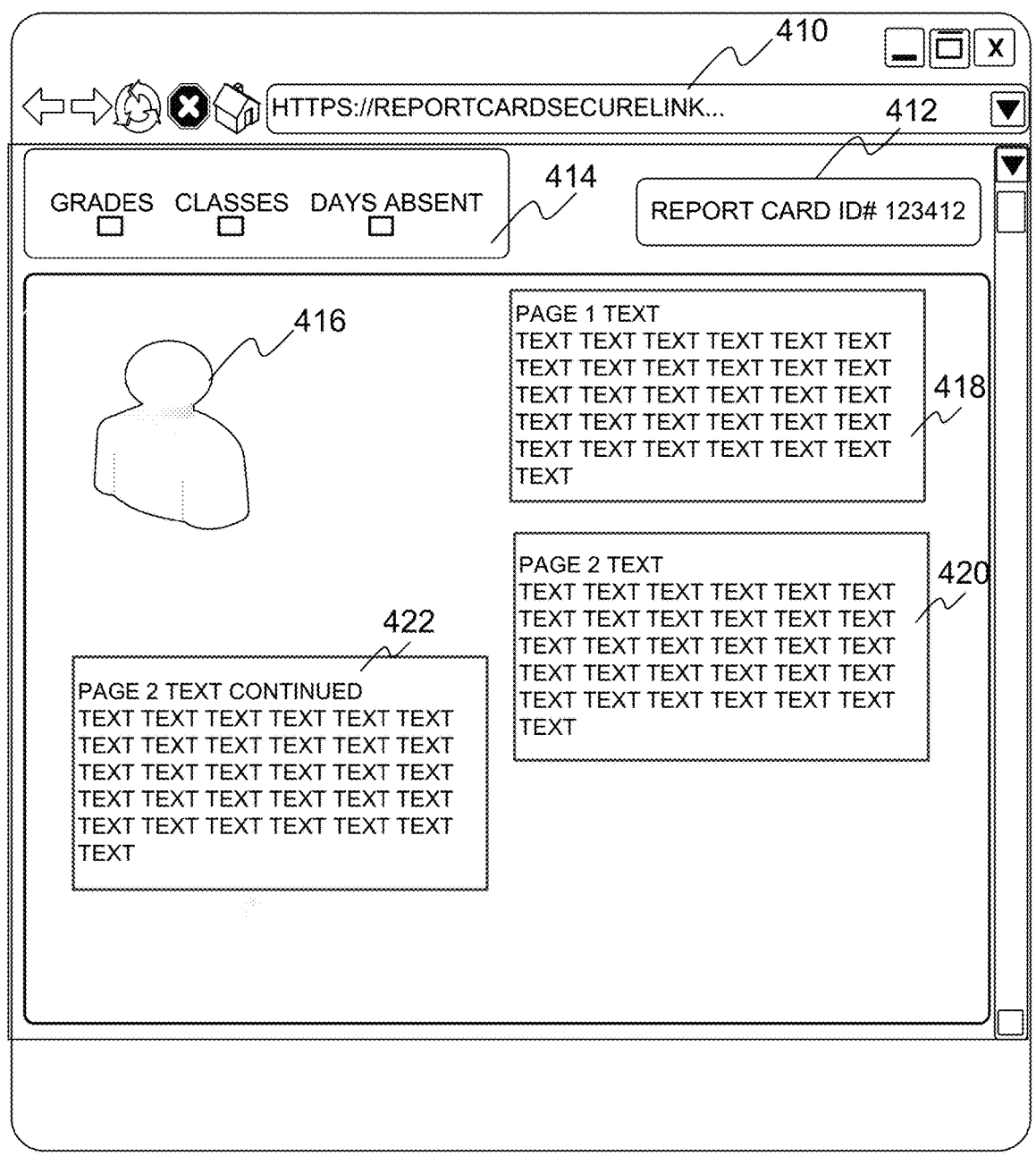
FIG. 4 illustrates an example user interface of the new document according to example embodiments.

FIG. 4 illustrates an example user interface of the new document according to example embodiments. Referring to FIG. 4, the new document 400 may be only one page based on content from 2 or more pages of the original document. The document may be presented in a web link format 410 with various fields 412, 414 and 416 identifying the various sections of the original document which were parsed, extracted and/or organized into the new document customized for the individual user associated with the content extracted. The new document may contain an image of the user 416, a series of text boxes or areas which include text from the first and second pages associated with the user identifier 412. The page text 418 may be from the first page associated with the particular user and may include content 420 and 422 from the second page.

Figure 5:
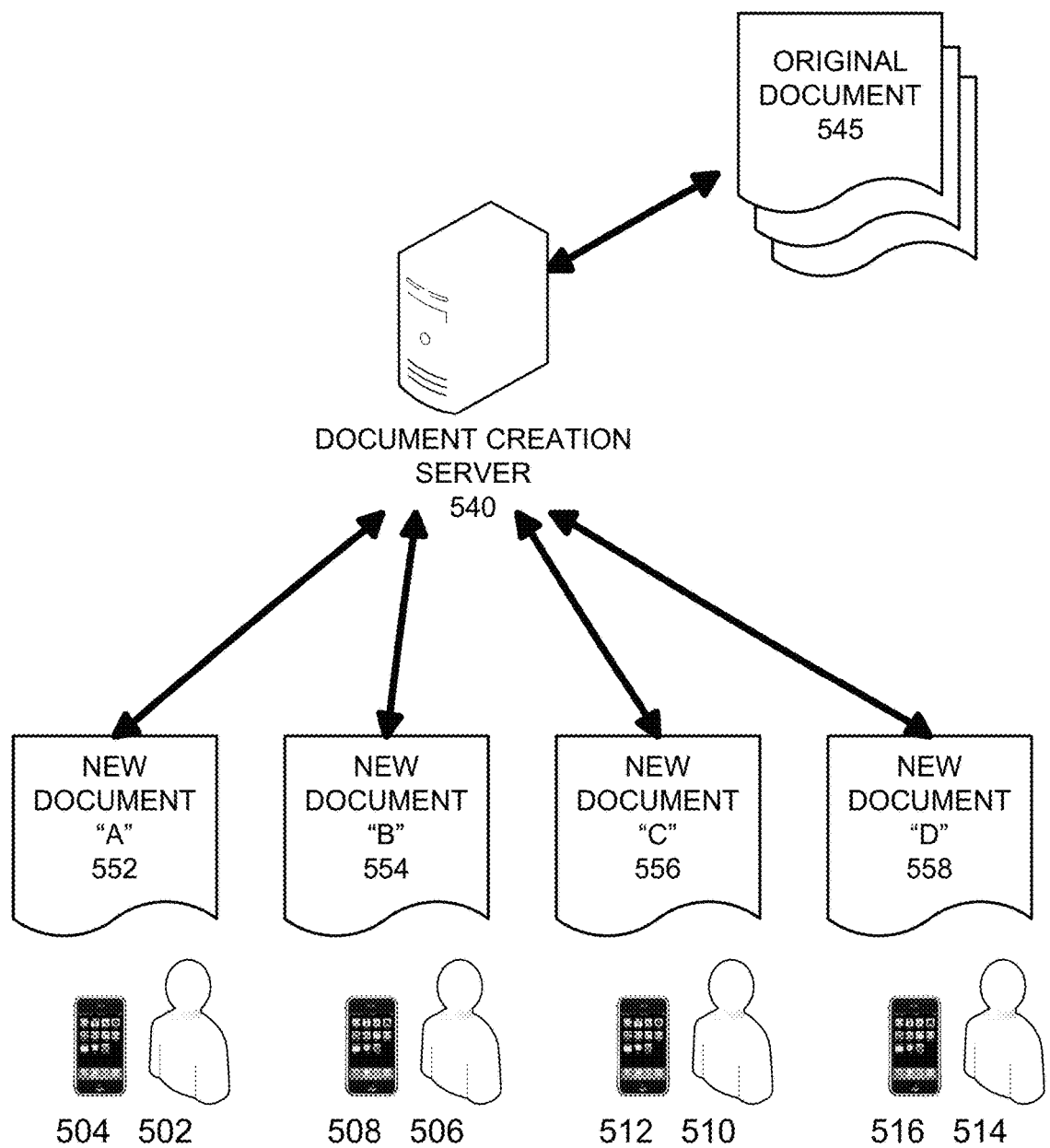
FIG. 5 illustrates an example network diagram of multiple document creation procedure according to example embodiments.

FIG. 5 illustrates an example network diagram of a multiple document creation procedure according to example embodiments. Referring to FIG. 5, the document creation server 540 may reference the original document 545 to create a plurality of different new documents based on one or more extraction variables or extraction attributes. For instance, for each user attribute, identifier, name, ID number, etc., a new document may be created by applying a template to the original document which includes coordinates, a user identifier and bounding box properties used to form the portions of the pages necessary to extract a shorter and customized new document for each user 502, 506, 510 and 514. The new documents 552-558 may be sent to the user computing devices 504, 508, 512 and 516.

Figure 6A:
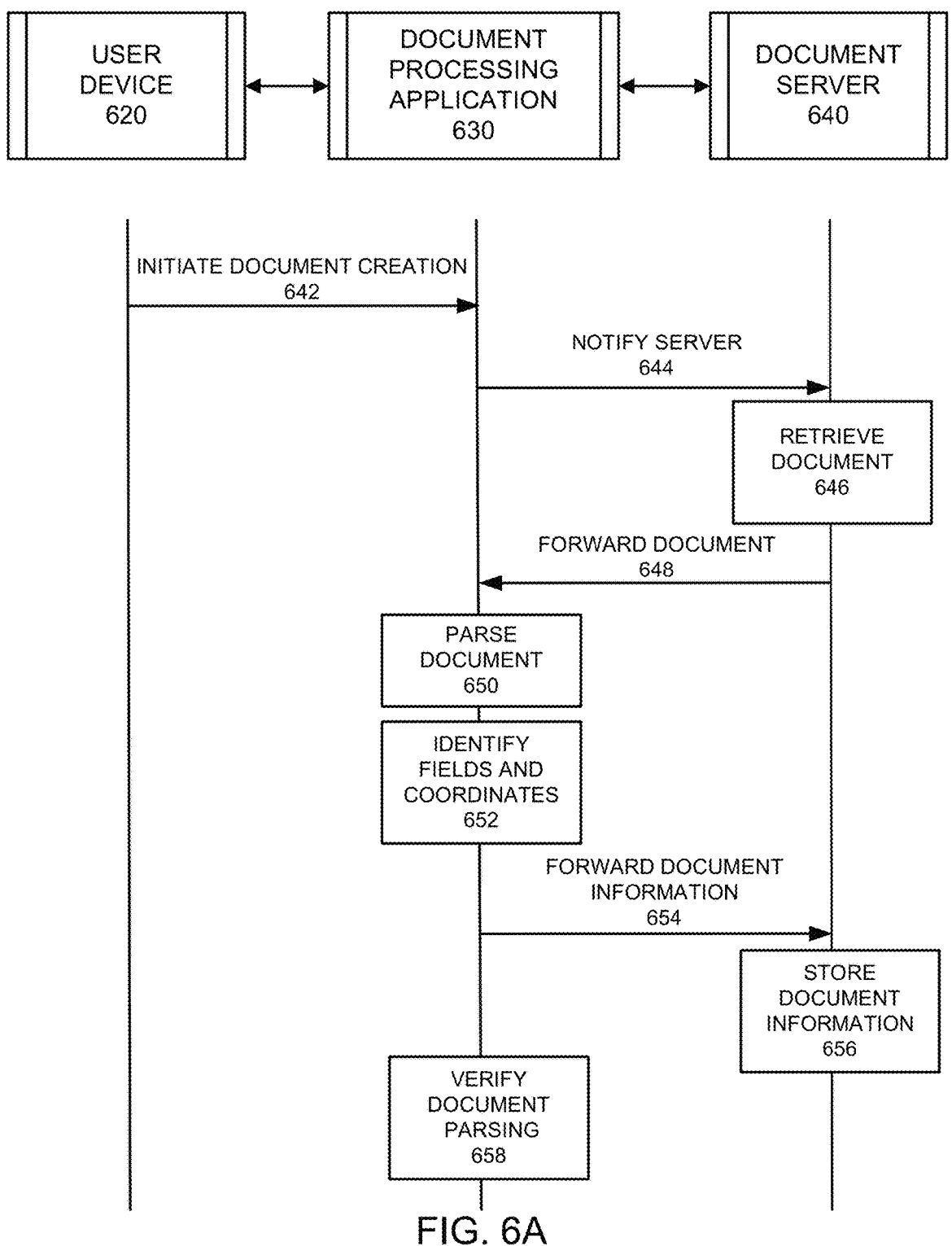
FIG. 6A illustrates an example system communication diagram according to example embodiments.

FIG. 6A illustrates an example system communication diagram according to example embodiments. In this example 600, the user device 620 may initiate a document creation command 642 that is received and processed by the document processing application 630 which notifies 644 the remote document server 640 to store, retrieve and process the document. The server may retrieve the document 646 and forward the document 648 to the application once the document is uploaded to the server's repository. The document can be parsed 650 to identify any user identifiers which may be the basis for a new document creation. In addition to the identifiers, the fields and coordinates 652 may be processed and the portions of the document may be identified and selected as the basis for the new document including one or more bounding boxes, images, user identifiers, etc. That document information 654 may be forwarded to the server for storage 656 and the document may be verified by a parsing operation 658 to ensure the contents are correct prior to creating a notification with a document link.

Figure 6B:
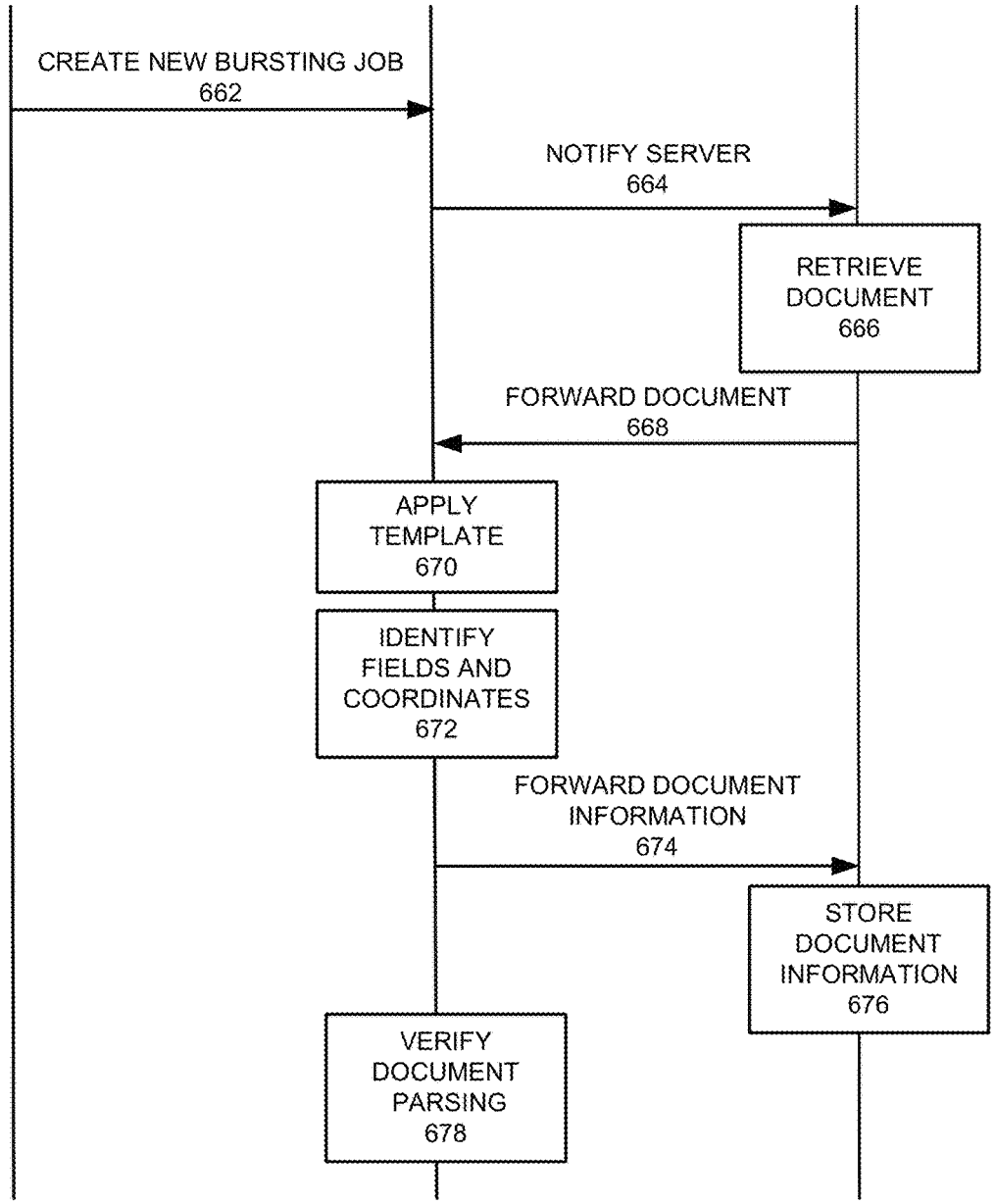
FIG. 6B illustrates an example system communication diagram according to example embodiments.

FIG. 6B illustrates another example system communication diagram according to example embodiments. Referring to FIG. 6B, the diagram 660 includes the user device 620 initiating a bursting job operation 662 to the application 630 which then notifies the server 664 to retrieve the document 666. The document is sent back 668 to the application 630 and a template is applied 670 which includes one or more identifiers, coordinates, fields, and other properties 672 so the document information can be forwarded 674 to the server to store 676 the information and so the application can verify the document via a parsing operation 678.

Figure 7:
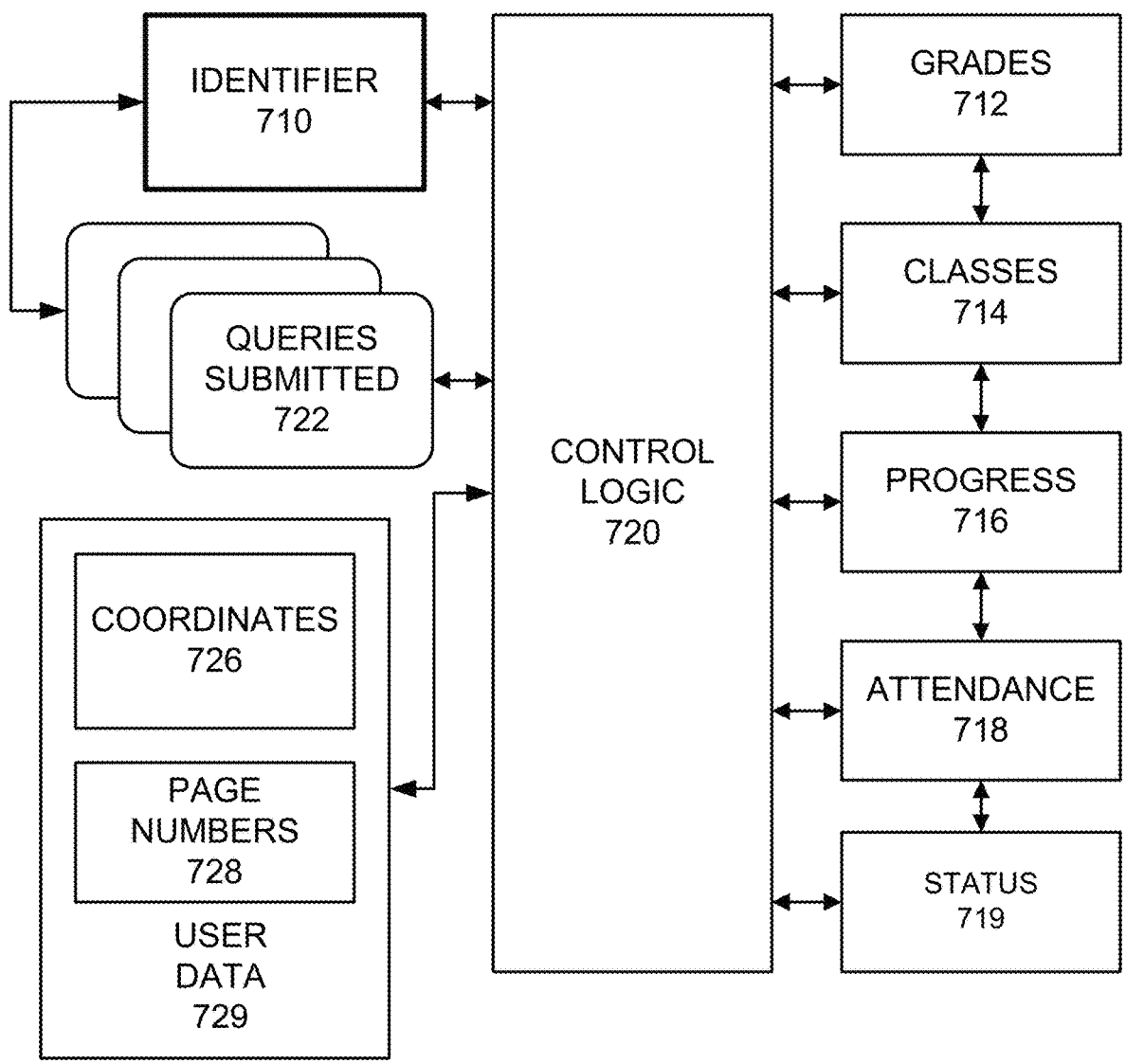
FIG. 7 illustrates an example software logic module configuration according to example embodiments.

FIG. 7 illustrates an example software logic module configuration according to example embodiments. In this example, the various modules of the logic diagram 700 are part of the input and output values utilized to perform the various software application functions performed by the application in unison with the user device and/or the remote server. For example, the control logic 720 may be performed via a computing processor with inputs, such as an identifier 710 of a user, queries submitted 722 to initiate the identification of the user identifier and other user fields and attributes. For example, the queries may utilize the coordinates 726, page numbers 728 and/or other user data 729 as the basis for the new document(s) to be created. The outputs included on the new document may include fields or boxes, such as user grades 712, classes 714, progress 716, attendance variables 718 and a present status 719. It is important to note that other types of user information (i.e., employees, clients, etc.) other than student information may be utilized by the example embodiments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 8 illustrates an example network element 800, which may represent any of the above-described network components of the other figures.

Figure 8:
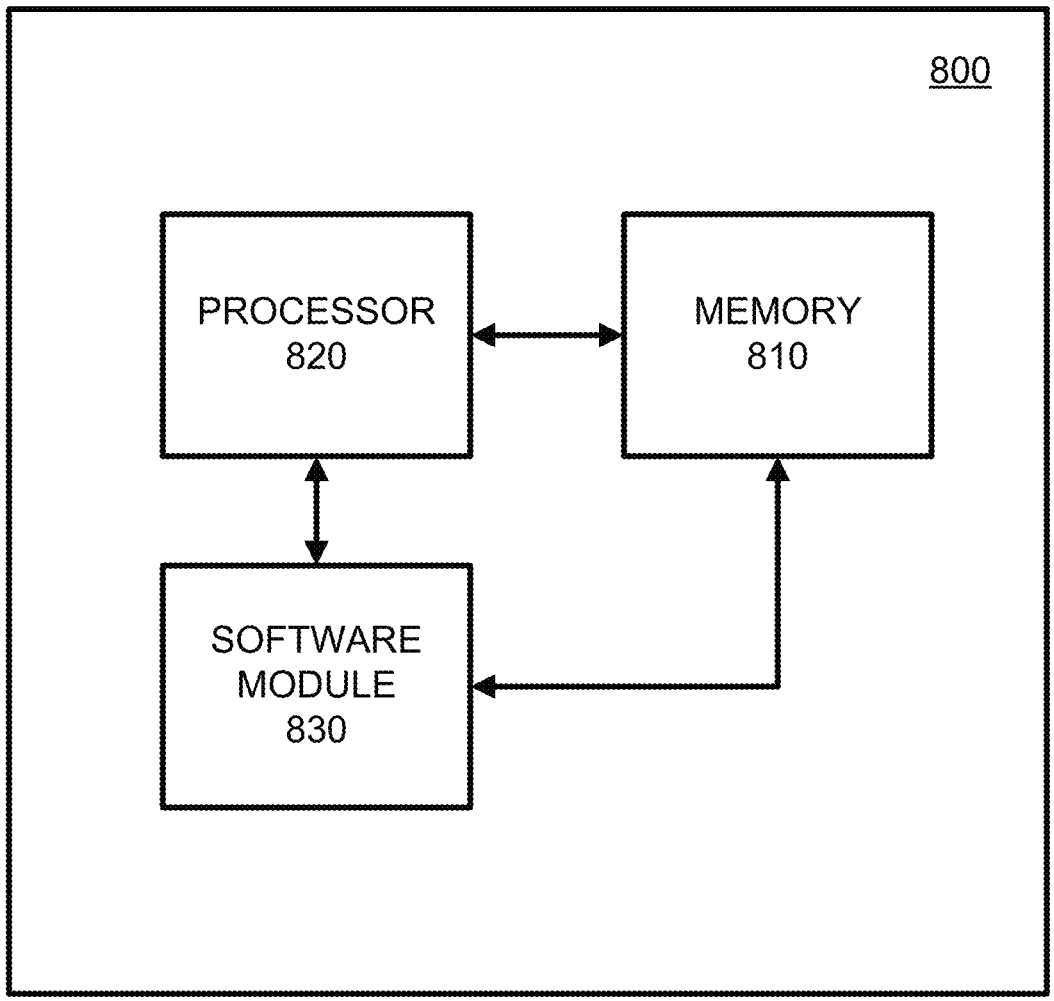
FIG. 8 illustrates an example network entity device configured to store instructions, software, and corresponding hardware for executing the same, according to example embodiments of the present application.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. The computer readable medium may be a non-transitory computer readable medium that includes tangible hardware components in addition to software stored in memory. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    identifying coordinates for a unique identifier within a document, the unique identifier identifying a location of a particular portion of the document;
    creating a bursting template that maps the particular portion of the document based on the coordinates;
    identifying one or more extraction attributes corresponding to one or more users identified in the particular portion of the document;
    creating, based on the bursting template, one or more new documents corresponding to the one or more users;
    searching the one or more new documents around the coordinates to locate one or more potential identifiers in a text format;
    validating the one or more potential identifiers;
    extracting a subset of the text that makes up the one or more potential identifiers;
    generating a summary containing the one or more extraction attributes, the one or more users, and a link corresponding to each user of the one or more users;
    sending the summary to the one or more users;
    providing a link to a document, of the one or more new documents, to a user, of the one or more users, in response to the user selecting a corresponding link in the summary;
    selecting one of the links; and
    validating a correct operation of the bursting template.

2. The method of claim 1, wherein the one or more extraction attributes comprise at least one of a user identifier and a user name.

3. The method of claim 1, comprising:
identifying a position of the unique identifier, the position comprising left justified, center justified, right justified, top justified, middle justified, or bottom justified.

4. The method of claim 1, comprising:
querying the document for the one or more extraction attributes, a number of pages for each new document, and coordinates of the unique identifier.

5. The method of claim 1, wherein the bursting template comprises:
x and y page coordinates to be used, a number of header or footer pages to skip, and a number of pages per record.

6. The method of claim 1, wherein the one or more notifications comprise e-mail messages.

7. The method of claim 1, wherein the one or more new documents corresponds to a number of persons identified in the document.

8. An apparatus, comprising:
a processor to:
identify coordinates for a unique identifier within a document, the unique identifier identifying a location of a particular portion of the document;
create a bursting template that maps the particular portion of the document based on the coordinates;
identify one or more extraction attributes corresponding to one or more users identified in the particular portion of the document;
create, based on the bursting template, one or more new documents corresponding to the one or more users;
search the one or more new documents around the coordinates to locate one or more potential identifiers in a text format;
validate the one or more potential identifiers;
extract a subset of the text that makes up the one or more potential identifiers;
generate a summary containing the one or more extraction attributes, the one or more users, and a link corresponding to each user of the one or more users;
send the summary to the one or more users;
provide a link to a document, of the one or more new documents, to a user, of the one or more users, in response to the user selecting a corresponding link in the summary;
select one of the links; and
validate a correct operation of the bursting template.

9. The apparatus of claim 8, wherein the one or more extraction attributes comprise at least one of a user identifier and a user name.

10. The apparatus of claim 8, wherein the processor further is to:
identify a position of the unique identifier, the position comprising left justified, center justified, right justified, top justified, middle justified, or bottom justified.

11. The apparatus of claim 8, wherein the processor further is to:
query the document for the one or more extraction attributes, a number of pages for each new document, and coordinates of the unique identifier.

12. The apparatus of claim 8, wherein the bursting template comprises:
x and y page coordinates to be used, a number of header or footer pages to skip, and a number of pages per record.

13. The apparatus of claim 8, wherein the one or more notifications comprise e-mail messages.

14. The apparatus of claim 8, wherein the one or more new documents corresponds to a number of persons identified in the document.

15. A non-transitory computer readable storage medium configured to store one or more instructions that when executed by a processor causes the processor to perform:
identifying coordinates for a unique identifier within a document, the unique identifier identifying a location of a particular portion of the document;
creating a bursting template that maps the particular portion of the document based on the coordinates;
identifying one or more extraction attributes corresponding to one or more users identified in the particular portion of the document;
creating, based on the bursting template, one or more new documents corresponding to the one or more users;
searching the one or more new documents around the coordinates to locate one or more potential identifiers in a text format;
validating the one or more potential identifiers;
extracting a subset of the text that makes up the one or more potential identifiers;
generating a summary containing the one or more extraction attributes, the one or more users, and a link corresponding to each user of the one or more users;
sending the summary to the one or more users;
providing a link to a document, of the one or more new documents, to a user, of the one or more users, in response to the user selecting a corresponding link in the summary;
selecting one of the links; and
validating a correct operation of the bursting template.

16. The non-transitory computer readable storage medium of claim 15, wherein the one or more extraction attributes comprise at least one of a user identifier and a user name.

17. The non-transitory computer readable storage medium of claim 15, wherein the one or more instructions are further to cause the processor to perform:
identifying a position of the unique identifier, the position comprising left justified, center justified, right justified, top justified, middle justified, or bottom justified.

18. The non-transitory computer readable storage medium of claim 15, the one or more instructions are further to cause the processor to perform:
querying the document for the one or more extraction attributes, a number of pages for each new document, and coordinates of the unique identifier.

19. The non-transitory computer readable storage medium of claim 15, wherein the bursting template comprises:
x and y page coordinates to be used, a number of header or footer pages to skip, and a number of pages per record.

20. The non-transitory computer readable storage medium of claim 15, wherein the one or more notifications comprise:
e-mail messages, and wherein the one or more new documents corresponds to a number of persons identified in the document.

* * * * *